(12) United States Patent
Morita

(10) Patent No.: US 12,744,453 B2
(45) Date of Patent: Sep. 22, 2026

(54) CURRENT LIMITING CIRCUIT

(71) Applicant: ROHM Co., LTD., Kyoto (JP)

(72) Inventor: Tomoaki Morita, Kyoto (JP)

(73) Assignee: ROHM CO., LTD., Kyoto (JP)

( * ) Notice: Subject to any disclaimer, the term of this patent is extended or adjusted under 35 U.S.C. 154(b) by 244 days.

(21) Appl. No.: 18/611,832

(22) Filed: Mar. 21, 2024

(65) Prior Publication Data

US 2024/0333136 A1 Oct. 3, 2024

(30) Foreign Application Priority Data

Mar. 28, 2023 (JP) ................................ 2023-051485

(51) Int. Cl.
*H02M 1/32* (2007.01)
*H02M 1/00* (2007.01)
*H02M 3/158* (2006.01)

(52) U.S. Cl.
CPC .......... *H02M 1/32* (2013.01); *H02M 1/0006* (2021.05); *H02M 3/158* (2013.01); *H02M 1/0009* (2021.05)

(58) Field of Classification Search
None
See application file for complete search history.

(56) References Cited

FOREIGN PATENT DOCUMENTS

JP 2022136418 9/2022
JP 2022136418 A * 9/2022 .......... H02M 1/0009

OTHER PUBLICATIONS

M.A. Al-Qutayri,A prototype supply current monitor for testing analogue circuits, Sep. 1997, IEEE, Tenth Annual IEEE International ASIC Conference and Exhibit (Cat. No. 97TH8334) (Year: 1997).*
Behnam Samadpoor Rikan, 1.6-ppm/°C Reference Voltage Generator with PSRR of -93dB based on Threshold Voltage Difference of LVT and SVT Devices, Nov. 2018, IEEE,2018 International SoC Design Conference (ISOCC) (Year: 2018).*

* cited by examiner

*Primary Examiner* — Crystal L Hammond
*Assistant Examiner* — Seung Ho Choi
(74) *Attorney, Agent, or Firm* — CHIP Law Group

(57) ABSTRACT

Provided is a current limiting circuit for limiting an upper limit of an output current to a predetermined value, the current limiting circuit including a current monitor circuit that outputs a monitor voltage according to a first current generated by a first voltage and supplied to an output terminal and an auxiliary power supply circuit to which a second voltage higher than the first voltage is supplied and which supplies a second current to the output terminal to suppress an increase in the first current when the first current exceeds a threshold current, based on the monitor voltage.

2 Claims, 9 Drawing Sheets

10
21
3
Vth1
Vm1
Vs1
Q1
R1
V1+V2
Q2
Vs2
V2
8
R2
Vm2
4
5
SWITCHING POWER SUPPLY
Is
I1
L
I2
C
I3
2

Vs1
(V)
0
t1
t(sec)

11
21
22
23
8
SWITCHING POWER SUPPLY
5
4
7
6
3
Q1
Q2
Q3
Q4
R1
R2
L
C
2
Vs1
Vs2
Vs3
Vm2
V1+V2
V2
Vth1
Vm1
I1
I2
I3
Is

CURRENT LIMITING CIRCUIT

CROSS REFERENCE TO RELATED APPLICATIONS

This application claims priority benefit of Japanese Patent Application No. JP 2023-051485 filed in the Japan Patent Office on Mar. 28, 2023. Each of the above-referenced applications is hereby incorporated herein by reference in its entirety.

BACKGROUND

The present disclosure relates to a current limiting circuit.

A power supply circuit for supplying voltage and current to loads is generally equipped with a circuit for preventing overcurrent flowing through the power supply circuit in order to protect the power supply circuit.

As an example of such a circuit, JP 2022-136418A describes an overcurrent protection circuit.

DETAILED DESCRIPTION

Figure 1:
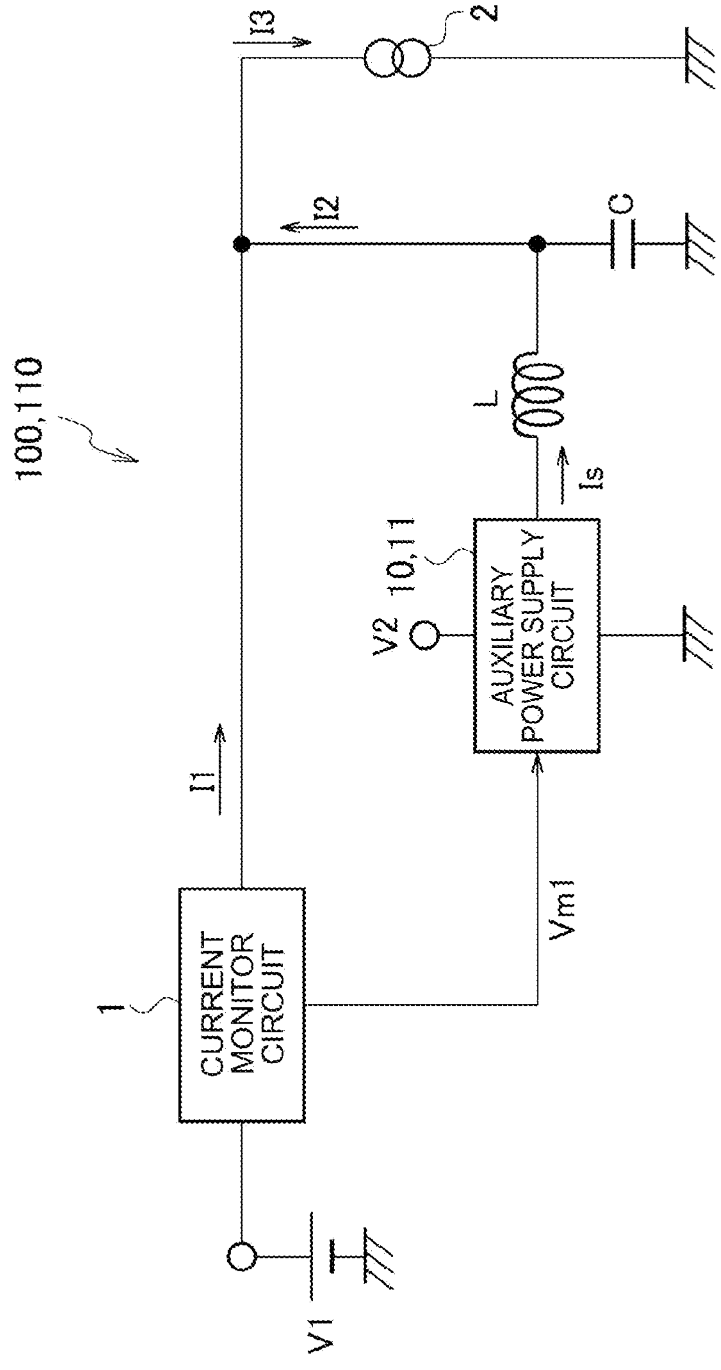
FIG. 1 is a circuit diagram illustrating an example of a power supply circuit.

Embodiments will be described with reference to the drawings. In the description in the drawings, the same parts are denoted by the same reference numerals, and the description thereof will be omitted. Note that the embodiments described below are comprehensive or specific examples. The numerical values, shapes, materials, constituent elements, and installation positions and connection forms of the constituent elements illustrated in the following embodiments are examples, and are not intended to limit the scope of the present disclosure. Moreover, among the constituent elements in the following embodiments, constituent elements that are not described in the independent claim indicating the most significant concept will be described as optional constituent elements. Further, the dimensional proportions in the drawings are exaggerated for explanatory convenience and may differ from the actual proportions.

Further, the reference examples and embodiments described below may include similar constituent elements, the similar constituent elements are given the same reference numerals, and redundant descriptions will be omitted.

FIG. 1 is a diagram illustrating an example of a power supply circuit 100 according to a reference example to which a current limiting circuit 110 according to an embodiment is applied. Hereinbelow, after description of the configuration of the power supply circuit 100, the current limiting circuit 110 according to the embodiment will be described.

Reference Example

Figure 2A:
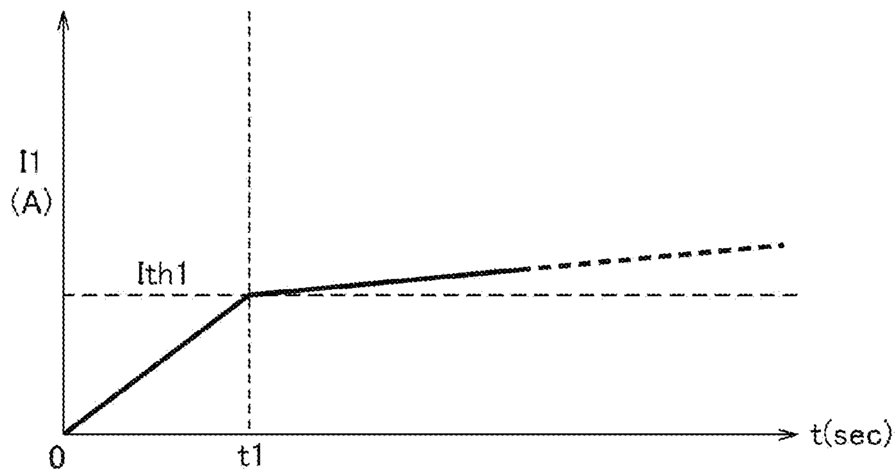
FIG. 2A is a diagram illustrating a current value of a first current I1 of the power supply circuit in FIG. 1.
Figure 2B:
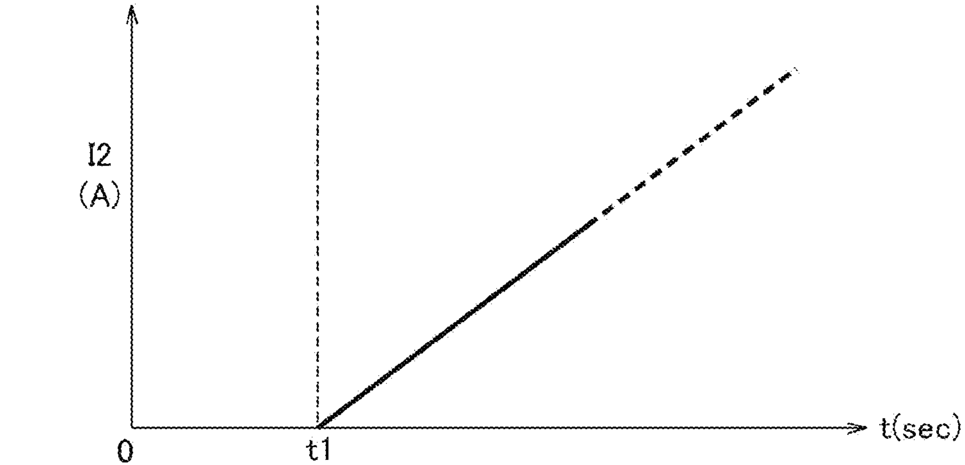
FIG. 2B is a diagram illustrating a current value of a second current I2 of the power supply circuit in FIG. 1.
Figure 2C:
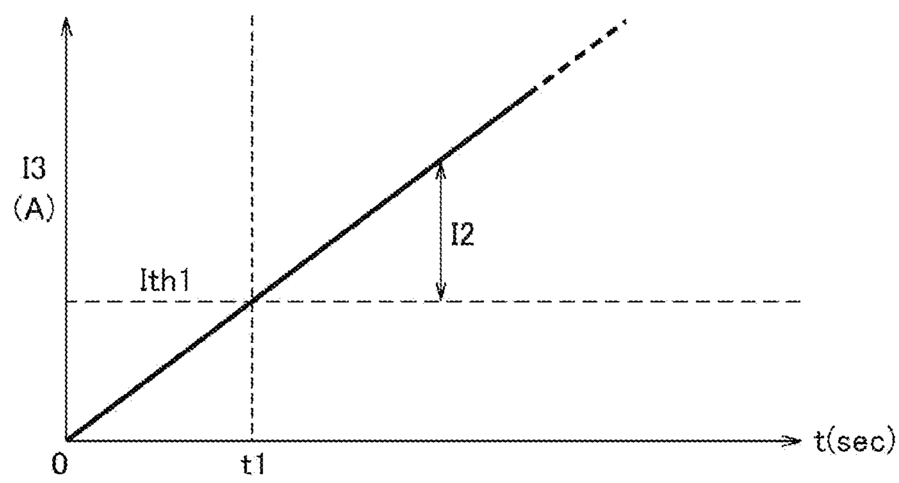
FIG. 2C is a diagram illustrating a current value of a third current I3 of the power supply circuit in FIG. 1.

FIGS. 2A, 2B, and 2C are diagrams illustrating current values of a first current I1, second current I2, and third current I3 of the power supply circuit 100 according to the reference example.

The power supply circuit 100 illustrated in FIG. 1 is a circuit for supplying a constant current having a predetermined magnitude to an output terminal 2. The power supply circuit 100 includes a first direct current (DC) power supply that supplies a first voltage V1, the output terminal 2, a current monitor circuit 1, and an auxiliary power supply circuit 10. The current monitor circuit 1 outputs a monitor voltage Vm1 corresponding to the first current I1 generated by the first voltage V1 (for example, +5V) from the first DC power supply and supplied to the output terminal 2. The auxiliary power supply circuit 10 is supplied with a second voltage V2 higher than the first voltage V1 (for example, +12V), from a second DC power supply, and supplies the second current I2 to the output terminal 2 when the first current I1 exceeds a first threshold current Ith1 on the basis of the monitor voltage Vm1. The auxiliary power supply circuit 10 is a switching power supply that operates at a high frequency, and outputs a high frequency auxiliary current Is. The auxiliary power supply circuit 10 can be configured by a component such as an integrated circuit (IC), for example.

The auxiliary current Is is rectified to be the second current I2 which is a direct current, by a rectifier circuit including an inductor L whose first end is connected to the output of the auxiliary power supply circuit 10, and a capacitor C connected between the second end of the inductor L and the ground. The magnitude of the second current I2 is approximately half the magnitude of the amplitude of the auxiliary current Is. The third current I3, which is the sum of the first current I1 and the second current I2, is supplied to the output terminal 2 as a constant current of a predetermined magnitude.

Here, as illustrated in FIG. 2C, a case will be considered in which the power supply circuit 100 is operated to supply the output terminal 2 with the third current I3 that increases in proportion to time t.

At this time, between times 0 and t1, the power supply circuit 100 supplies only the first current I1 generated by the first voltage V1 to the output terminal 2, as illustrated in FIG. 2A. Then, at time t1, when the current monitor circuit 1 detects that the first current I1 has reached the first threshold current Ith1 determined based on the performance of the first power supply, the auxiliary power supply circuit 10 starts to output the auxiliary current Is, and the second current I2 is supplied to the output terminal 2. Then, at time t1, the first current I1 generated by the first voltage V1 decreases as illustrated in FIG. 2A. Then, when the third current I3 is increased after time t1 as illustrated in FIG. 2C, the increase in the first current I1 is suppressed as illustrated in FIG. 2A, and the auxiliary power supply circuit 10 operates to increase the second current I2 as illustrated in FIG. 2B. In addition, in FIG. 2A, the change in the first current I1 is illustrated in an easy-to-understand manner, but the amount of the increase in the first current I1 after time t1 is extremely small compared to the increase in the first current I1 before time t1, and can be ignored relative to the increase in the second current I2 after time t1.

Figure 3:
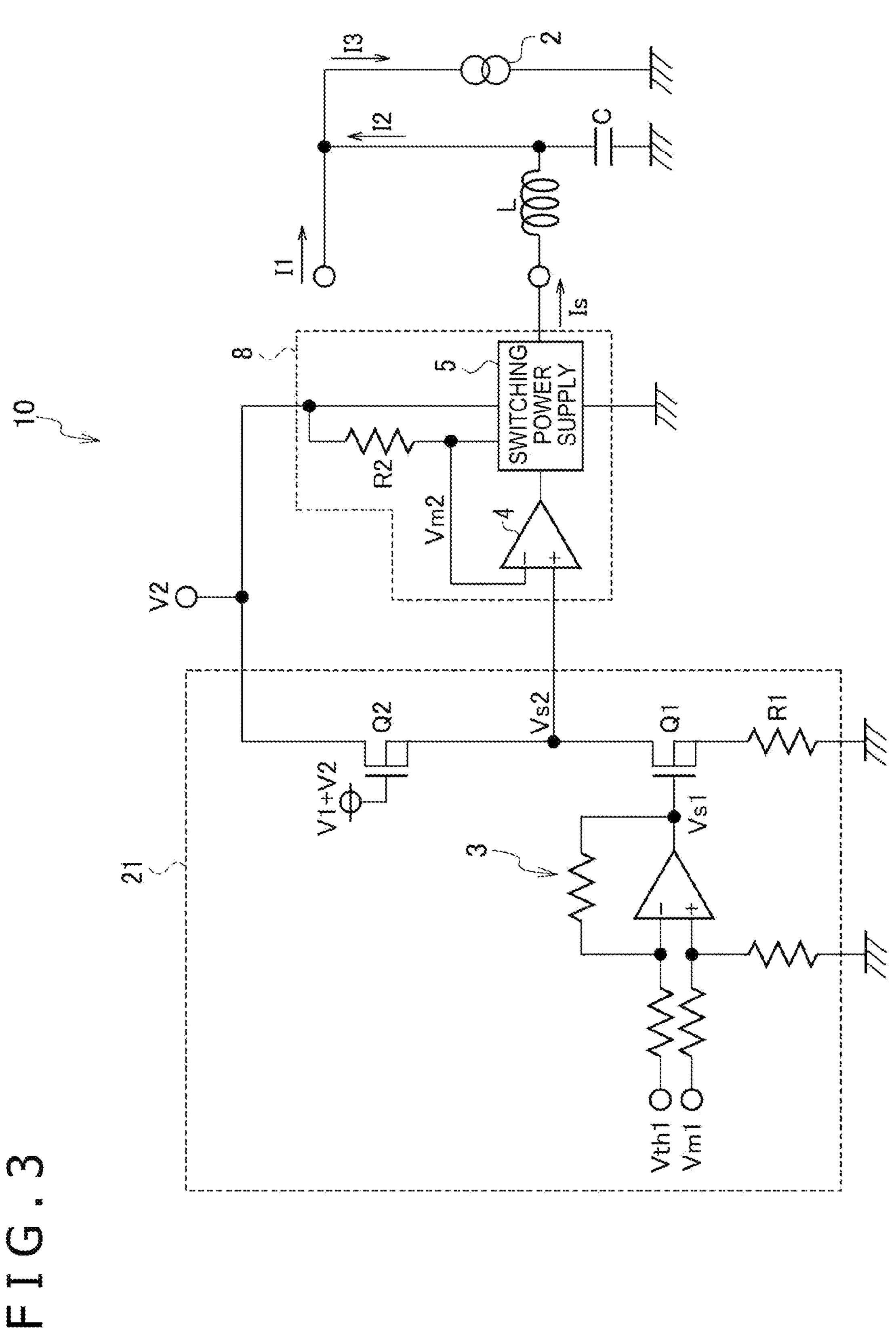
FIG. 3 is a circuit diagram illustrating an example of an auxiliary power supply circuit according to a reference example provided in the power supply circuit in FIG. 1.

FIG. 3 is a circuit diagram illustrating an example of the auxiliary power supply circuit 10 for operating the power supply circuit 100 to control the first current I1, the second current I2, and the third current I3 as illustrated in FIGS. 2A, 2B, and 2C. The auxiliary power supply circuit 10 includes a control voltage generation circuit 21 and a current generation circuit 8.

The control voltage generation circuit 21 includes a first differential amplifier 3, a first transistor Q1, a second transistor Q2, and a first resistor R1. The first transistor Q1 and the second transistor Q2 are configured by a metal-oxide-semiconductor field-effect transistor (MOSFET), for example. The first differential amplifier 3 has a positive input terminal + to which the monitor voltage Vm1 is input, and a negative input terminal − to which an upper limit voltage Vth1 corresponding to the first threshold current Ith1 is input, and outputs a differential voltage Vs1 between the monitor voltage Vm1 and the upper limit voltage Vth1. The amplification factor of the first differential amplifier 3 can be appropriately set by a resistor connected to the first differential amplifier 3. The differential voltage Vs1 is input to a control electrode (e.g., gate) of the first transistor Q1. As for the second transistor Q2, the second voltage V2 is input to its first main electrode (e.g., drain), the first main electrode (e.g., drain) of the first transistor Q1 is connected to its second main electrode (e.g., source), and a voltage that is the sum of the first voltage V1 and the second voltage V2 is input to its control electrode (e.g., the gate). The first resistor R1 has a first end connected to the second main electrode of the first transistor Q1, and a second end connected to the ground. A control voltage Vs2 is output from the connection point between the first transistor Q1 and the second transistor Q2.

The current generation circuit 8 includes a switching power supply 5, a second differential amplifier 4, and a second resistor R2. The switching power supply 5 is supplied with the second voltage V2 and generates the high-frequency auxiliary current Is from the second voltage V2. The second resistor R2 has a first end to which the second voltage V2 is input, and a second end connected to the switching power supply 5. The value of a signal voltage Vm2 at the second end of the second resistor R2 is V2 when the auxiliary current Is is zero, and decreases from V2 as the auxiliary current Is increases. The control voltage Vs2 is input to the positive input terminal + of the second differential amplifier 4, and the signal voltage Vm2 is input to the negative input terminal − thereof. The switching power supply 5 is turned on and off according to the output of the second differential amplifier 4, thereby outputting the high-frequency auxiliary current Is whose amplitude corresponds to V2-Vs2.

Figures 4A, 4B:
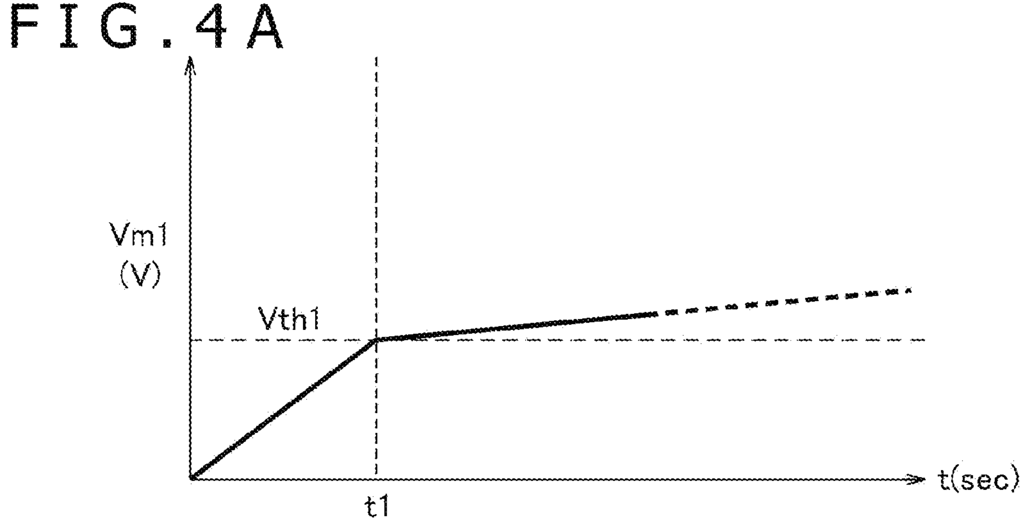
FIG. 4A is a diagram illustrating a voltage value of a monitor voltage Vm1 of the auxiliary power supply circuit according to the reference example.
FIG. 4B is a diagram illustrating a voltage value of a differential voltage Vs1 of the auxiliary power supply circuit according to the reference example.
Figure 4C:
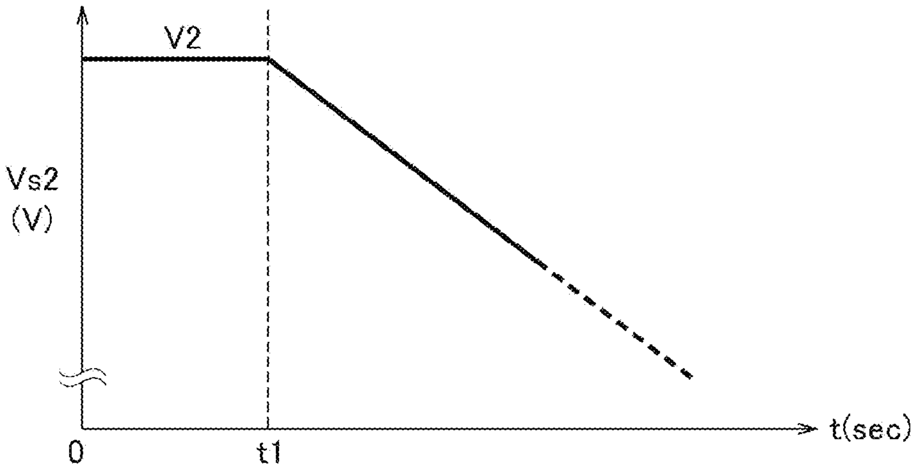
FIG. 4C is a diagram illustrating a voltage value of a control voltage Vs2 of the auxiliary power supply circuit according to the reference example.

Next, the operation of the auxiliary power supply circuit 10 of the reference example will be described. FIGS. 4A, 4B, and 4C are diagrams illustrating voltage values of the monitor voltage Vm1, differential voltage Vs1, and control voltage Vs2 of the auxiliary power supply circuit 10.

As illustrated in FIG. 4A, the monitor voltage Vm1 changes according to the change in the first current I1 in FIG. 2A. Then, when the monitor voltage Vm1 is smaller than the upper limit voltage Vth1, which is the value corresponding to the first threshold current Ith1, the differential voltage Vs1 output from the first differential amplifier 3 is zero, as illustrated in FIG. 4B. At this time, the first transistor Q1 is in the off state, and the control voltage Vs2 is equal to the second voltage V2, as illustrated in FIG. 4C. At this time, since the output of the second differential amplifier 4 is zero, the auxiliary current Is, which is the output of the switching power supply 5, is also zero. Therefore, only the first current I1 is supplied to the output terminal 2 as the third current I3.

Then, when the monitor voltage Vm1 reaches the upper limit voltage Vth1 at time t1, the first differential amplifier 3 starts to output a positive voltage proportional to Vm1-Vth1 as the differential voltage Vs1. Then, the first transistor Q1 is turned on according to the value of the differential voltage Vs1, and a current flows through the first resistor R1, so that the control voltage Vs2 starts to decrease as illustrated in FIG. 4C. Then, the switching power supply 5 is turned on and off according to the output of the second differential amplifier 4, and starts to output the high-frequency auxiliary current Is whose amplitude corresponds to V2-Vs2, and the output terminal 2 is supplied with a DC current equal to the sum of the first current I1 and the second current I2 as the third current I3.

Then, after time t1, since the DC current that is the sum of the first current I1 and the second current I2 is supplied to the output terminal 2 as the third current I3, the rate of increase in the first current I1 decreases, so that the rate of increase in the monitor voltage Vm1 also decreases. In the first differential amplifier 3, the amplification factor of the differential voltage Vs1 has been set so that the second current I2 having a desired magnitude is generated according to the magnitude of the monitor voltage Vm1 whose increase rate has decreased.

With such a configuration, in the power supply circuit 100, when the first current I1 is equal to or less than the first threshold current Ith1, only the first current I1 is supplied to the output terminal 2 as the third current I3, and when the first current I1 exceeds the first threshold current Ith1, a DC current equal to the sum of the first current I1 and the second current I2 is supplied to the output terminal 2 as the third current I3.

However, since the auxiliary power supply circuit 10 does not have a structure that determines the upper limit of the high-frequency auxiliary current Is for generating the second current I2, there is a risk that the auxiliary current Is may rise beyond the rated currents of the auxiliary power supply circuit 10 and the inductor L. Furthermore, as the auxiliary current Is rises, the second current I2 and the third current I3 also rise, so that there is a risk that the second current I2 and third current I3 may rise beyond the rated currents of external components etc.

Embodiment

Figure 5:
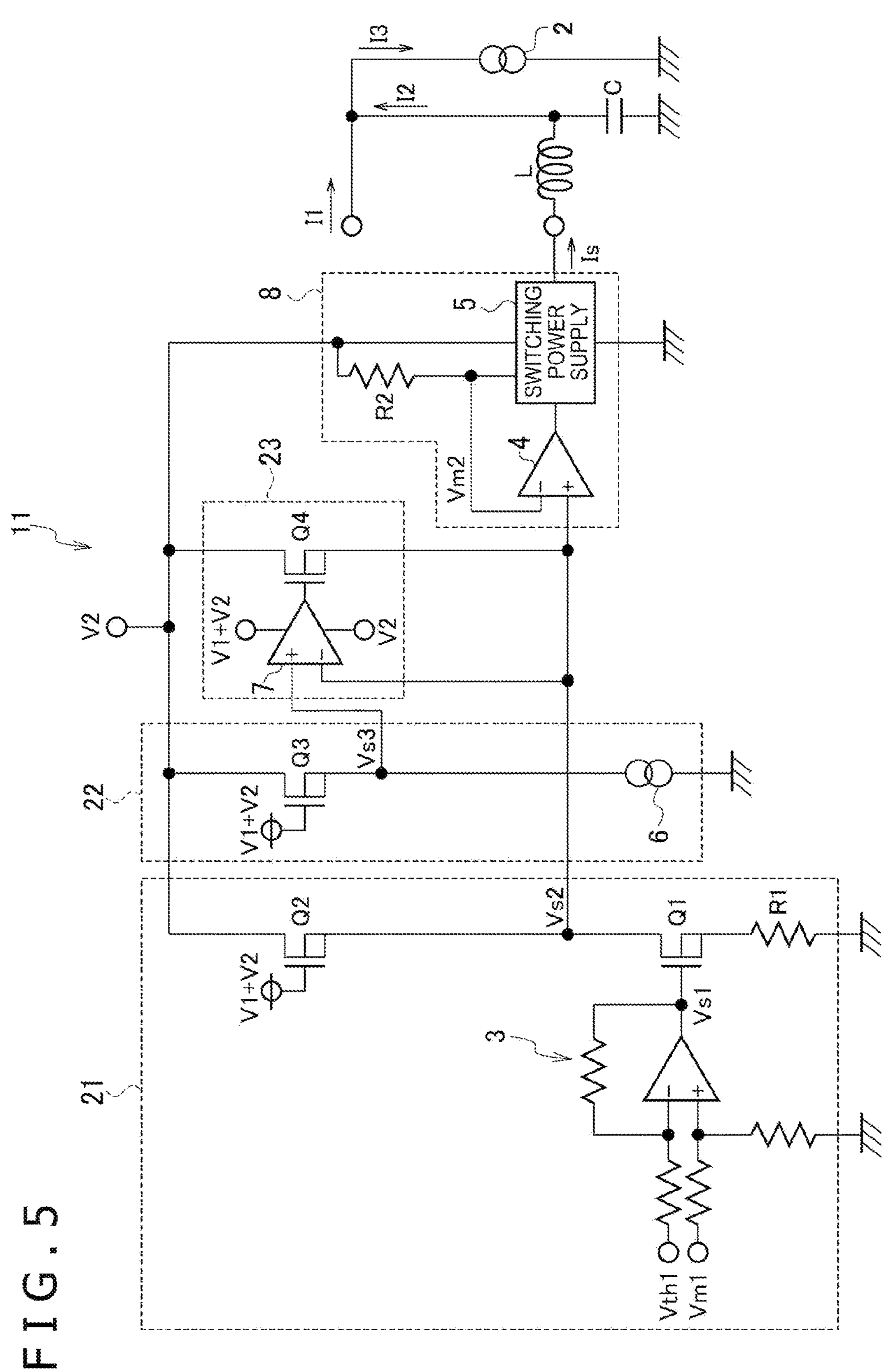
FIG. 5 is a circuit diagram illustrating an example of an auxiliary power supply circuit used in a current limiting circuit according to an embodiment.

FIG. 5 is a circuit diagram illustrating an example of an auxiliary power supply circuit 11 according to an embodiment applicable to the power supply circuit 100 illustrated in FIG. 1. In the embodiment, the current monitor circuit 1 and the auxiliary power supply circuit 11 constitute the current limiting circuit 110 that limits the upper limit of the output current of the power supply circuit 100 to a predetermined value.

In the current limiting circuit 110 of the embodiment, the auxiliary power supply circuit 11 differs from the auxiliary power supply circuit 10 of the reference example in that the auxiliary power supply circuit 11 further includes a threshold voltage generation circuit 22 and a limiting circuit 23 as a configuration for limiting the upper limit value of the auxiliary current Is. Other configurations of the power supply circuit 100 including the other current limiting circuit 110 are the same as those of the power supply circuit 100 of the reference example, and detailed description thereof will be omitted.

As described above, the auxiliary power supply circuit 11 of the embodiment illustrated in FIG. 5 further includes the threshold voltage generation circuit 22 and the limiting circuit 23 in addition to the auxiliary power supply circuit 10 of the reference example illustrated in FIG. 3. The threshold voltage generation circuit 22 is a circuit for generating a threshold voltage Vs3 according to the upper limit values of the auxiliary current Is, second current I2, and third current I3. The limiting circuit 23 is a circuit for limiting the lower limit value of the control voltage Vs2 to the threshold voltage Vs3.

The threshold voltage generation circuit 22 includes a third transistor Q3 and a variable constant current source 6. The third transistor Q3 includes a MOSFET, for example. The second voltage V2 is input to the first main electrode (e.g., drain) of the third transistor Q3. The variable constant current source 6 has a first end connected to the second main electrode (e.g., source) of the third transistor Q3, and a second end connected to the ground. The threshold voltage Vs3 is output from the connection point between the third transistor Q3 and the variable constant current source 6. By adjusting the current value of the variable constant current source 6, the threshold voltage Vs3 can be optionally set according to the upper limit value of the desired auxiliary current Is, second current I2, or third current I3.

The limiting circuit 23 includes a fourth transistor Q4 and a third differential amplifier 7. The fourth transistor Q4 includes a MOSFET, for example. The fourth transistor Q4 has a first main electrode (e.g., drain) to which the second voltage V2 is input, and a second main electrode (e.g., source) to which the connection point between the first transistor Q1 and the second transistor Q2 is connected. As for the third differential amplifier 7, the control voltage Vs2 is input to its negative input terminal −, the threshold voltage Vs3 is input to its positive input terminal +, and its output terminal is connected to the control electrode (e.g., gate) of the fourth transistor Q4.

The control voltage Vs2 whose lower limit value is limited to the threshold voltage Vs3 is input to the positive input terminal + of the second differential amplifier 4 of the current generation circuit 8.

Figure 6A:
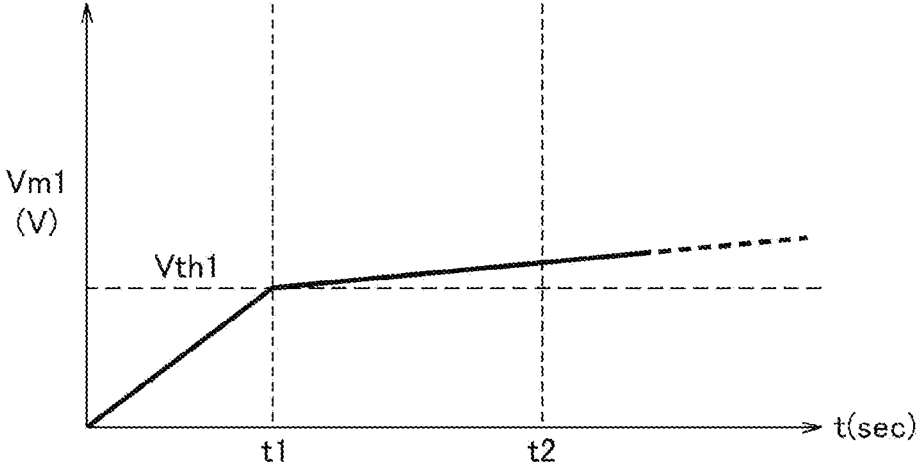
FIG. 6A is a diagram illustrating the voltage value of the monitor voltage Vm1 of a power supply circuit including the current limiting circuit according to the embodiment.
Figure 6B:
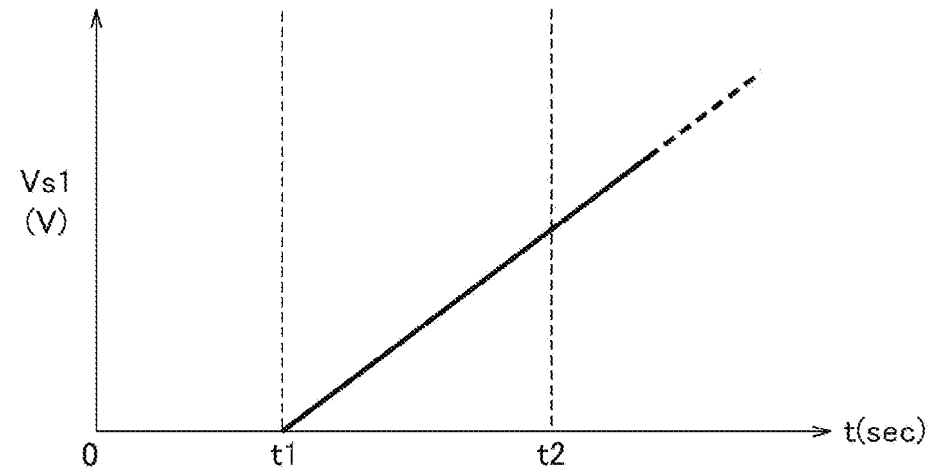
FIG. 6B is a diagram illustrating the voltage value of the differential voltage Vs1 of the power supply circuit including the current limiting circuit according to the embodiment.
Figure 6C:
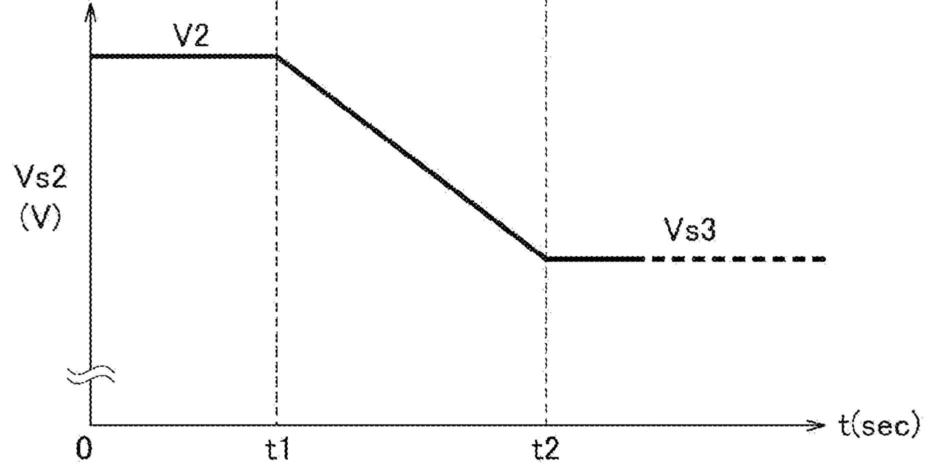
FIG. 6C is a diagram illustrating the voltage value of the control voltage Vs2 of the power supply circuit including the current limiting circuit according to the embodiment.
Figure 7A:
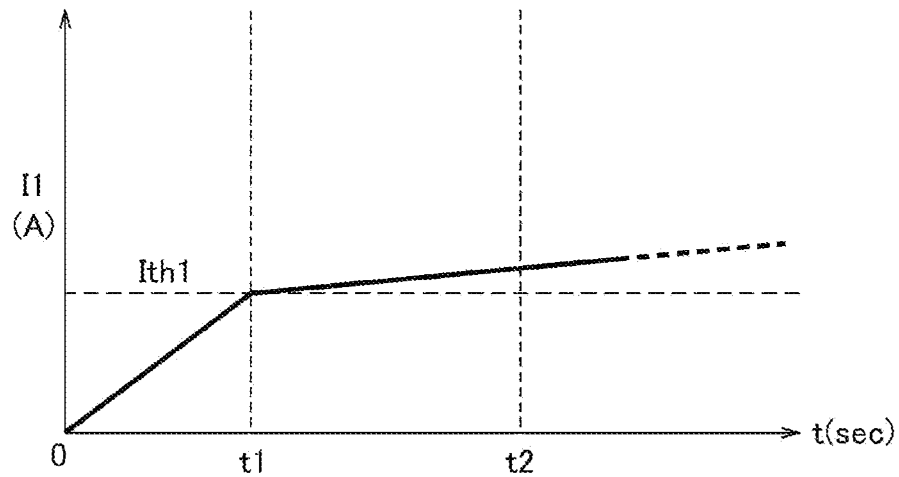
FIG. 7A is a diagram illustrating the current value of the first current I1 of the power supply circuit including the current limiting circuit according to the embodiment.
Figure 7B:
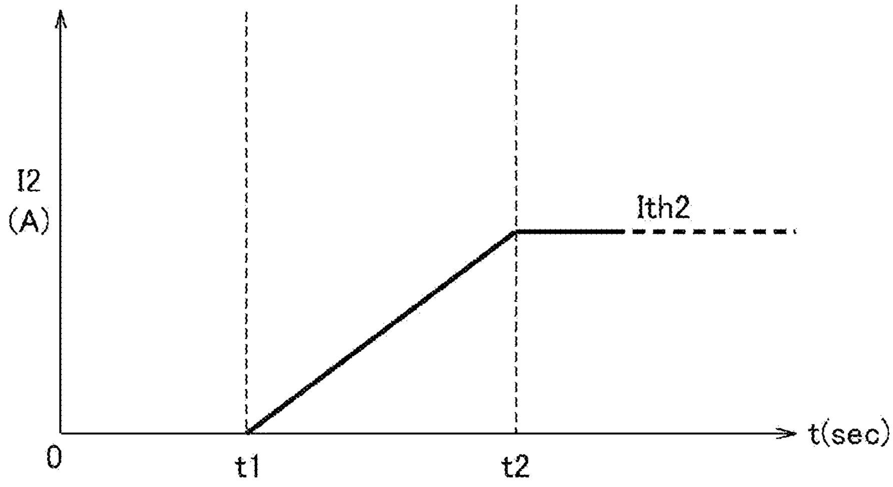
FIG. 7B is a diagram illustrating the current value of the second current I2 of the power supply circuit including the current limiting circuit according to the embodiment.
Figure 7C:
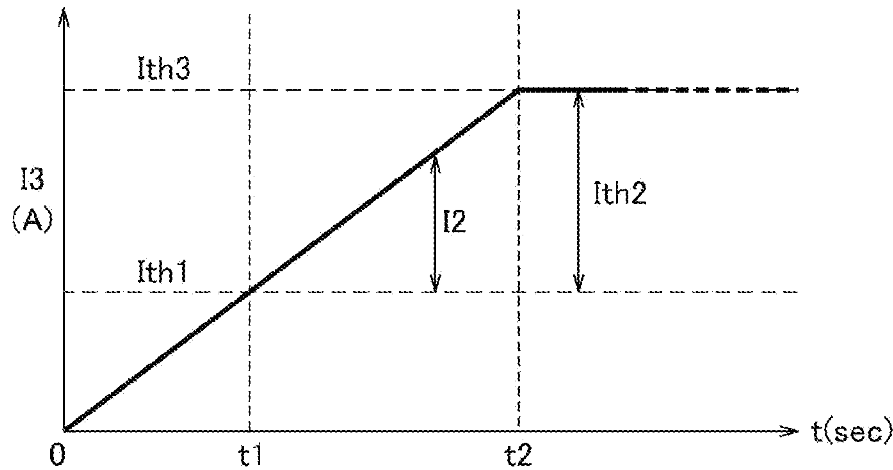
FIG. 7C is a diagram illustrating the current value of the third current I3 of the power supply circuit including the current limiting circuit according to the embodiment.

Next, the operation of the power supply circuit 100 including the current limiting circuit 110 according to the embodiment will be described by using FIGS. 6A, 6B, and 6C and FIGS. 7A, 7B, and 7C. FIGS. 6A, 6B, and 6C are diagrams illustrating voltage values of the monitor voltage Vm1, differential voltage Vs1, and control voltage Vs2 of the power supply circuit 100 including the current limiting circuit 110. FIGS. 7A, 7B, and 7C are diagrams illustrating the current values of the first current I1, second current I2, and third current I3 of the power supply circuit 100 including the current limiting circuit 110.

As for FIGS. 6A, 6B, and 6C and FIGS. 7A, 7B, and 7C, since operation of the power supply circuit 100 including the current limiting circuit 110 until time t2 is the same as that of the power supply circuit 100 according to the reference example described with reference to FIGS. 4A, 4B, and 4C, detailed description will be omitted.

After time t1, as the differential voltage Vs1 increases as illustrated in FIG. 6B, the control voltage Vs2 decreases from the second voltage V2 as illustrated in FIG. 6C. Then, as the fourth transistor Q4 turns on according to the output of the third differential amplifier 7, the potential of the second main electrode of the fourth transistor Q4 changes to be equal to the control voltage Vs2. When the control voltage Vs2 decreases and becomes equal to the threshold voltage Vs3 at time t2, the potential of the second main electrode of the fourth transistor Q4 also becomes equal to the threshold voltage Vs3 by the third differential amplifier 7. Even if the differential voltage Vs1 further increases after time t2, since the third differential amplifier 7 maintains the potential of the second main electrode of the fourth transistor Q4 at the threshold voltage Vs3, the lower limit value of the control voltage Vs2 is limited to the threshold voltage Vs3, as illustrated in FIG. 6C.

Therefore, after time t2, the constant voltage of the threshold voltage Vs3 is input to the positive input terminal + of the second differential amplifier 4, and the switching power supply 5 is turned on and off according to the output of the second differential amplifier 4, and therefore outputs the high-frequency auxiliary current Is whose amplitude is limited according to a constant voltage of V2-Vs3.

Then, after time t2, as illustrated in FIG. 7B, the second current I2 is limited to Ith2, and as illustrated in FIG. 7C, the third current I3, which is the sum of the first current I1 and the second current I2, is limited to Ith3=Ith1+Ith2.

As described above, according to the current limiting circuit 110 related to the embodiment, since the upper limit of the output currents such as the auxiliary current Is, the second current I2, and the third current I3 can be limited to a predetermined value, the current can be prevented from increasing beyond the rated currents of the auxiliary power supply circuit 11, the inductor L, the external components, etc.

Note that the above-described embodiment is an example of the present disclosure. Therefore, the present disclosure naturally allows various modifications according to the design etc., without being limited to the above-described embodiments, even for forms other than the above embodiments, as long as they do not depart from the technical idea of the present disclosure.

(Supplementary Note)

(Supplementary Note 1: FIGS. 1, 5, 6A, 6B, 6C, 7A, 7B, and 7C)

The current limiting circuit 110 for limiting the upper limits of the output currents Is, I2, and I3 to predetermined values has the current monitor circuit 1 that outputs the monitor voltage Vm1 corresponding to the first current I1 generated by the first voltage V1 and supplied to the output terminal 2, and the auxiliary power supply circuit 11 that is supplied with the second voltage V2 higher than the first voltage V1, and supplies the second current I2 to the output terminal 2 on the basis of the monitor voltage Vm1, to suppress an increase in the first current I1 when the first current I1 exceeds the threshold current Ith1. The auxiliary power supply circuit 11 includes the control voltage generation circuit 21 that generates the control voltage Vs2 that decreases as the monitor voltage Vm1 increases, the threshold voltage generation circuit 22 that generates the threshold voltage Vs3 that corresponds to the upper limit value of the second current 12, the limiting circuit 23 that limits the lower limit value of the control voltage Vs2 to the threshold voltage Vs3, and the current generation circuit 8 that outputs the auxiliary current Is for generating the second current I2 on the basis of the differential voltage between the second voltage V2 and the control voltage Vs2. In the current limiting circuit 110 described according to Supplementary note 1, since the upper limits of the auxiliary current Is, second current I2, and third current I3 can be limited to predetermined values, a current exceeding the rated current of the auxiliary power supply circuit 11, inductor L, external components, or other components can be prevented from flowing.

(Supplementary Note 2: FIG. 5)

In the current limiting circuit 110 according to Supplementary Note 1, the control voltage generation circuit 21 includes a first differential amplifier 3 that has a positive input terminal + to which the monitor voltage Vm1 is input and a negative input terminal—to which an upper limit voltage Vth1 corresponding to the threshold current Ith1 is input, and outputs a differential voltage Vs1 between the monitor voltage Vm1 and the upper limit voltage Vth1, a first transistor Q1 having a control electrode to which the differential voltage Vs1 is input, a second transistor Q2 having a first main electrode to which the second voltage V2 is input and a second main electrode to which a first main electrode of the first transistor Q1 is connected, and a resistor R1 whose first end is connected to a second main electrode of the first transistor Q1 and whose second end is connected to a ground. The control voltage Vs2 is output from a connection point between the first transistor Q1 and the second transistor Q2.

(Supplementary Note 3: FIG. 5)

In the current limiting circuit 110 according to Supplementary Note 2, the threshold voltage generation circuit 22 includes a third transistor Q3 having a first main electrode to which the second voltage V2 is input, and a variable constant current source 6 whose first end is connected to a second main electrode of the third transistor Q3 and whose second end is connected to the ground. The threshold voltage Vs3 is output from a connection point between the third transistor Q3 and the variable constant current source 6.

(Supplementary Note 4: FIG. 5)

In The current limiting circuit 110 according to Supplementary Note 3, the limiting circuit 23 includes a fourth transistor Q4 having a first main electrode to which the second voltage V2 is input and a second main electrode connected to the connection point between the first transistor Q1 and the second transistor Q2, and a third differential amplifier 7 having a negative input terminal—to which the control voltage Vs2 is input, a positive input terminal + to which the threshold voltage Vs3 is input, and an output terminal connected to a control electrode of the fourth transistor Q4.

(Supplementary Note 5: FIG. 5)

In the current limiting circuit 110 according to Supplementary Note 4, the current generation circuit 8 includes a switching power supply 5 to which the second voltage V2 is supplied, and a second differential amplifier 4 having a positive input terminal + to which the control voltage Vs2 is input and a negative input terminal – to which a signal voltage Vm2 decreasing from the second voltage V2 according to an output of the switching power supply 5 is input. The switching power supply 5 outputs the auxiliary current Is by being turned on and off according to an output of the second differential amplifier 4.

(Supplementary Note 6: FIGS. 1 and 5)

The current limiting circuit 110 according to Supplementary Note 5 further includes a rectifier circuit including an inductor L whose first end is connected to an output of the switching power supply 5, and a capacitor C whose first end is connected to a second end of the inductor L and whose second end is connected to the ground. The auxiliary current Is is rectified by the rectifier circuit to generate the second current I2.

According to one mode of the present disclosure, it is possible to provide a current limiting circuit that can limit the upper limit of the current output from the auxiliary power supply circuit to a predetermined value.

What is claimed is:

1. A current limiting circuit for limiting an upper limit of an output current to a predetermined value, the current limiting circuit comprising:

a current monitor circuit that outputs a monitor voltage according to a first current generated by a first voltage and supplied to an output terminal; and an auxiliary power supply circuit to which a second voltage higher than the first voltage is supplied and which supplies a second current to the output terminal to suppress an increase in the first current when the first current exceeds a threshold current, based on the monitor voltage, wherein the auxiliary power supply circuit includes a control voltage generation circuit that generates a control voltage that decreases as the monitor voltage increases, wherein the control voltage generation circuit includes a first differential amplifier that has a positive input terminal to which the monitor voltage is input and a negative input terminal to which an upper limit voltage corresponding to the threshold current is input, and outputs a differential voltage between the monitor voltage and the upper limit voltage, a first transistor having a control electrode to which the differential voltage is input, a second transistor having a first main electrode to which the second voltage is input and a second main electrode to which a first main electrode of the first transistor is connected, and a resistor whose first end is connected to a second main electrode of the first transistor and whose second end is connected to a ground, wherein the control voltage is output from a connection point between the first transistor and the second transistor;

a threshold voltage generation circuit that generates a threshold voltage according to an upper limit value of the second current, wherein the threshold voltage generation circuit includes a third transistor having a first main electrode to which the second voltage is input, and a variable constant current source whose first end is connected to a second main electrode of the third transistor and whose second end is connected to the ground, wherein the threshold voltage is output from a connection point between the third transistor and the variable constant current source;

a limiting circuit that limits a lower limit value of the control voltage to the threshold voltage, wherein the limiting circuit includes a fourth transistor having a first main electrode connected to the second voltage and a second main electrode connected to the connection point between the first transistor and the second transistor, and a third differential amplifier having a negative input terminal to which the control voltage is input, a positive input terminal to which the threshold voltage is input, and an output terminal connected to a control electrode of the fourth transistor; and a current generation circuit that outputs an auxiliary current for generating the second current, based on a differential voltage between the second voltage and the control voltage, wherein the current generation circuit includes a switching power supply to which the second voltage is supplied, and a second differential amplifier having a positive input terminal to which the control voltage is input, and a negative input terminal to which a signal voltage decreasing from the second voltage according to an output of the switching power supply is input, wherein the switching power supply outputs the auxiliary current by being turned on and off according to an output of the second differential amplifier.

2. The current limiting circuit according to claim 1, further comprising:

a rectifier circuit including an inductor whose first end is connected to the output of the switching power supply; and a capacitor having a first end and a second end, wherein the first end of the capacitor is connected to a second end of the inductor, and the second end of the capacitor is connected to the ground, and the auxiliary current is rectified by the rectifier circuit to generate the second current.

* * * * *